US011698136B1

(12) United States Patent
Fitzpatrick et al.

(10) Patent No.: US 11,698,136 B1
(45) Date of Patent: Jul. 11, 2023

(54) VALVE FOR VEHICLE (71) Applicant: Faurecia Automotive Seating, LLC, Auburn Hills, MI (US)

(72) Inventors: Robert C. Fitzpatrick, Auburn Hills, MI (US); Jeffery T. Bonk, Chesterfield, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 17/695,266

(22) Filed: Mar. 15, 2022

(51) Int. Cl.
*F16K 1/12* (2006.01)
*F16K 1/14* (2006.01)
*F16K 27/02* (2006.01)
*B60R 16/08* (2006.01)

(52) U.S. Cl.
CPC ............. *F16K 1/123* (2013.01); *B60R 16/08* (2013.01); *F16K 1/14* (2013.01); *F16K 27/0245* (2013.01)

(58) Field of Classification Search
CPC ........ F16K 1/123; F16K 1/14; F16K 27/0245; B60R 16/08
See application file for complete search history.

(56) References Cited

U.S. PATENT DOCUMENTS

| | | | | |
|---|---|---|---|---|
| 2,769,608 A | * | 11/1956 | Reinig | F16K 1/12 251/249.5 |
| 3,322,138 A | * | 5/1967 | Backman | F16K 1/123 137/219 |
| 6,213,144 B1 | * | 4/2001 | Moore | F16K 31/1221 137/219 |
| 10,358,332 B2 | * | 7/2019 | Clüsserath | B67C 3/04 |
| 2001/0018925 A1 | * | 9/2001 | Moore | F16K 1/123 137/219 |
| 2002/0195139 A1 | * | 12/2002 | Moore | F16K 31/1221 137/49 |
| 2016/0108699 A1 | * | 4/2016 | Martino | E21B 34/025 166/91.1 |

FOREIGN PATENT DOCUMENTS

| | | | |
|---|---|---|---|
| DE | 2109217 A1 | * 8/1972 | |
| DE | 2234114 A1 | * 1/1974 | |
| DE | 2615236 A1 | * 10/1977 | ............. F16K 1/123 |
| DE | 10357845 A1 | * 7/2005 | ............. F16K 1/123 |
| DE | 102011107677 A1 | 1/2013 | |
| EP | 0651868 B1 | * 3/1997 | |
| EP | 2594831 A1 | * 5/2013 | ............. A61M 16/20 |
| EP | 3267080 A1 | * 1/2018 | ............. F16K 1/123 |
| FR | 1208224 A | * 2/1960 | |
| FR | 1224625 A | * 6/1960 | |
| GB | 551475 A | * 2/1943 | |
| KR | 20060003918 A | 1/2006 | |
| KR | 101236712 B1 | 2/2013 | |
| KR | 101524090 B1 | 5/2015 | |

* cited by examiner

Primary Examiner — Marina A Tietjen
(74) Attorney, Agent, or Firm — Barnes & Thornburg LLP (57) ABSTRACT A fluid-distribution system for use with one or more vehicle sub-systems in a vehicle includes a first transfer conduit, a second transfer conduit, and a valve unit. The first transfer conduit defines a first interior space and is coupled to a fluid source to receive and direct a fluid through the first interior space. The second transfer conduit defines a second interior space and is spaced apart downstream from the first transfer conduit. The valve unit extends between and interconnects the first transfer conduit and the second transfer conduit.

20 Claims, 4 Drawing Sheets

VALVE FOR VEHICLE

BACKGROUND

The present disclosure relates to a valve, and particularly to a valve for a vehicle. More particularly, the present disclosure relates to a valve configured to block or allow fluid to pass through an opening to one or more sub-systems in the vehicle.

SUMMARY

According to the present disclosure, a vehicle includes a plurality of vehicle sub-systems and a fluid source configured to supply a fluid for use by one or more of the vehicle sub-systems. The vehicle sub-systems may include an air conditioning unit, a pneumatic system for a vehicle seat, a suspension system, or any other sub-system of the vehicle that uses a fluid for its operation. The fluid source may be a pump, fan, pressurized fluid source, or any other device that stores and/or provides the fluid (i.e. gas and/or liquid) for use by the one or more vehicle sub-systems.

In illustrative embodiments, the vehicle further includes a fluid-control system coupled between one or more of the vehicle sub-systems and the fluid source. The fluid-control system is configured to direct the fluid from the fluid source and control discharge of the fluid for use with one or more vehicle sub-systems.

In illustrative embodiments, the fluid-control system includes a fluid-distribution system coupled between the fluid source and the one or more vehicle sub-systems, an actuator configured to move the fluid-distribution system, and a controller. The fluid-distribution system includes a first transfer conduit, a second transfer conduit, and a valve unit extending between and interconnecting the first transfer conduit and the second transfer conduit. The first transfer conduit may be coupled to the fluid source and is coupled to an upstream end of the valve unit. The second transfer conduit is coupled to one or more vehicle sub-systems and a downstream end of the valve unit. The valve unit is configured to allow passage of fluid from the first transfer conduit to the second transfer conduit in an opened configuration and blocks passage of fluid from the first transfer conduit to the second transfer conduit in a closed configuration.

In illustrative embodiments, the valve unit is integral and unitary with the first transfer conduit and the second transfer conduit such that the first transfer conduit, the second transfer conduit, and the valve unit are formed as a one-piece component. The first transfer conduit, the second transfer conduit, and the valve unit may be formed together by additive manufacturing such that the fluid-distribution system is formed without any seals or openings between joints.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side elevation and diagrammatic view of a vehicle including a plurality of vehicle sub-systems, a fluid source configured to supply a fluid for use by the one or more of the vehicle sub-systems, and a fluid-control system configured to direct and control discharge of the fluid from the fluid source to at least one of the vehicle sub-systems, and showing that the fluid-control system includes a fluid-distribution system with portions cut away to expose an interior of the fluid-distribution system, an actuator coupled to the fluid-distribution system, and a controller configured to operate the actuator to move the fluid-distribution system between one or more opened configurations, as shown in FIG. 1, allowing fluid to flow from the fluid source to the at least one vehicle sub-system and a closed configuration, as shown in FIG. 2, blocking fluid flow from the fluid source to the at least one vehicle sub-system;

FIG. 3 is a perspective view of the fluid-distribution system from FIGS. 1 and 2 showing that the fluid-distribution system includes a first pipe, a second pipe, and a valve unit coupled between the first pipe and the second pipe, the valve unit including a deformable sleeve coupled to a downstream end of the first transfer conduit and an upstream end of the second transfer conduit and defining an interior space, a valve plunger arranged to lie in the interior space, and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends through the interior space;

DETAILED DESCRIPTION

Figure 1:
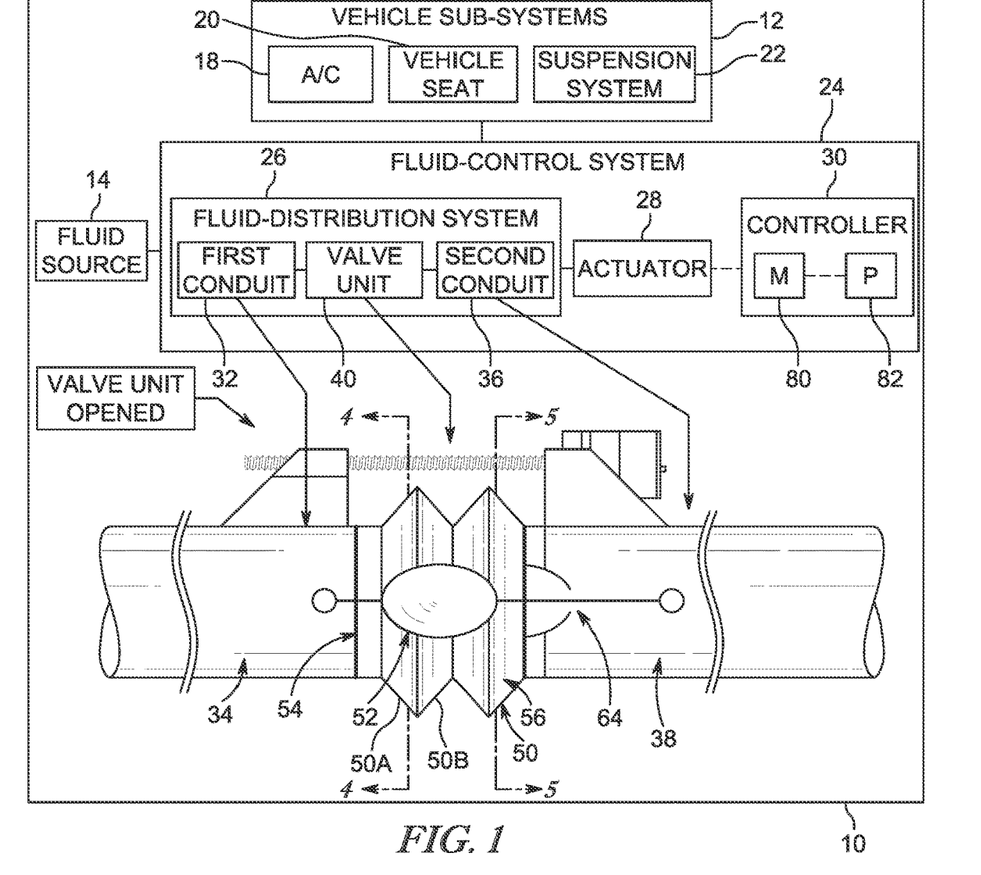

A vehicle 10 is shown diagrammatically in FIG. 1 and includes a plurality of vehicle sub-systems 12 and a fluid source 14 configured to supply a fluid 16 for use by one or more of the vehicle sub-systems 12. The vehicle sub-systems 12 may include an air conditioning unit 18, a pneumatic system 20 for a vehicle seat, a suspension system 22, or any other sub-system 12 of the vehicle 10 that uses a fluid for its operation. The fluid source 14 may be a pump, fan, pressurized fluid source, or any other device that stores and/or provides the fluid 16 (i.e. gas and/or liquid) for use by the one or more vehicle sub-systems 12.

The vehicle 10, in accordance with the present disclosure, further includes a fluid-control system 24 as shown in FIG. 1. The fluid-control system 24 is coupled between one or more of the vehicle sub-systems 12 and the fluid source 14. The fluid-control system 24 is configured to direct the fluid 16 from the fluid source 14 and control discharge of the fluid 16 for use with one or more vehicle sub-systems 12.

Figure 2:
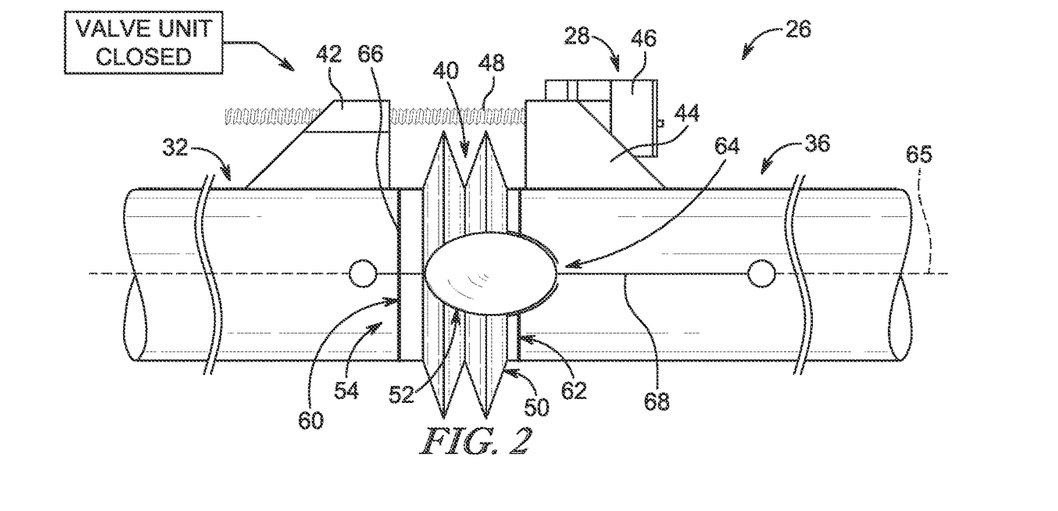
FIG. 2 is a side elevation view of the fluid-distribution system with portions cutaway to show the fluid-distribution system in the closed configuration blocking fluid from flowing downstream of the fluid-distribution system to the vehicle sub-system.

The fluid-control system 24 includes a fluid-distribution system 26 coupled between the fluid source 14 and the one or more vehicle sub-systems 12, an actuator 28, and a controller 30 as shown in FIGS. 1 and 2. The fluid-distribution system 26 carries the fluid 16 from the fluid source 14 to the vehicle sub-system 12 or blocks fluid 16 from traveling to the vehicle sub-system 12 depending on the configuration caused by the actuator 28. The actuator 28 is coupled to the fluid-distribution system 26 and is configured to move the fluid-distribution system 26 between one or more opened configurations, as shown in FIG. 1, allowing fluid 16 to flow to the vehicle sub-system 12 and a closed configuration, as shown in FIG. 2, blocking fluid flow to the vehicle sub-system 12. The controller 30 is optional and may be included in some embodiments to control operation of the actuator 28. For example, in some embodiments, the actuator 28 may be a manually operated actuator that is engaged directly by a user to change the configuration of the fluid-distribution system 26. In other embodiments, however, the actuator 28 is controlled by the controller 30 in response to a user input into a control panel (not shown), for example.

Figure 3:
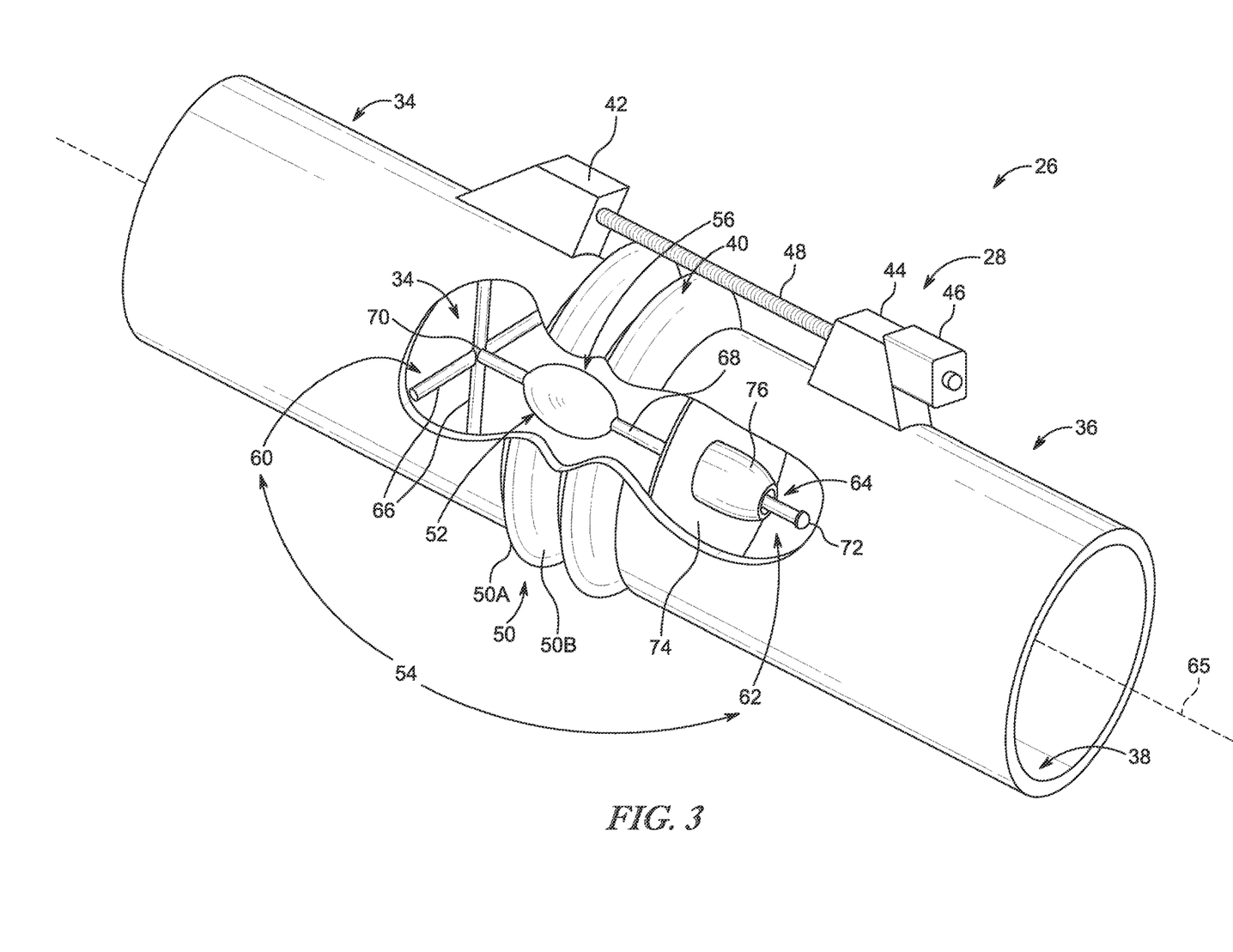
Figure 4:
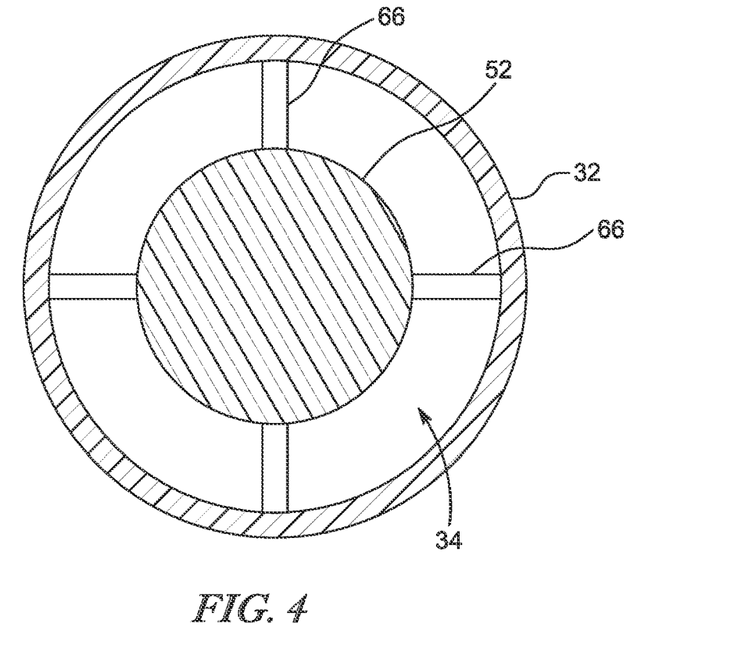
FIG. 4 is a cross section of the fluid-distribution system taken along line 4-4 in FIG. 1 showing a portion of the plunger and the plunger retainer, the plunger retainer including a plurality of plunger-retainer arms coupled to the first transfer conduit and the plunger.
Figure 5:
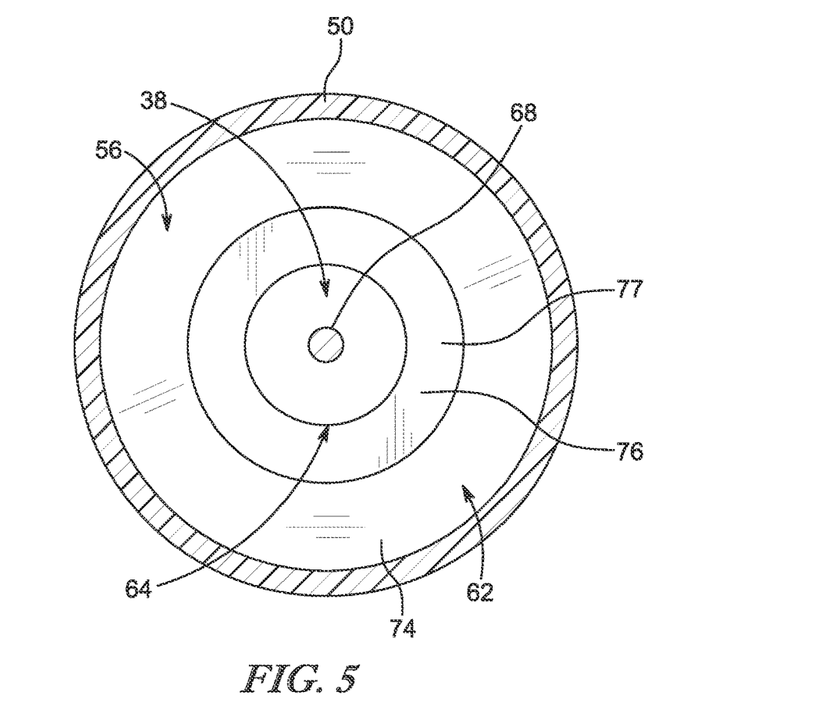
FIG. 5 is a cross section of the fluid-distribution system taken along line 5-5 in FIG. 1 showing a portion of the plunger and the plunger seat, the plunger seat including a peripheral seat ring coupled to the second transfer conduit and a seat nozzle coupled to a radially inner end of the seat ring and defining the plunger-seat opening.

The fluid-distribution system 26 includes a first transfer conduit 32 defining a first interior space 34, a second transfer conduit 36 defining a second interior space 38, and a valve unit 40 extending between and interconnecting the first transfer conduit 32 and the second transfer conduit 36 as shown in FIGS. 1-3. The first transfer conduit 32 may be coupled to the fluid source 14 and is configured to receive and direct the fluid 16 through the first interior space 34. The second transfer conduit 36 is spaced apart downstream from first transfer conduit 32 and is configured to receive and direct the fluid 16 through the second interior space 38 when the fluid-distribution system 26 is in an opened configuration. The valve unit 40 is configured to allow passage of fluid from the first internal space 34 to the second internal space 38 in the opened configuration and blocks passage of fluid from the first internal space 34 to the second internal space in the closed configuration.

The valve unit 40 is integral, or unitary, with the first transfer conduit 32 and the second transfer conduit 36 such that the first transfer conduit 32, the second transfer conduit 36, and the valve unit 40 are formed as a one-piece component. In one example, the first transfer conduit 32, the second transfer conduit 36, and the valve unit 40 are formed by additive manufacturing such that the fluid-distribution system 26 does not include any seals and/or joints between components. As such, the fluid-distribution system 26 in the illustrative embodiment reduces leaks or openings between components compared to other systems.

The actuator 28 is coupled to at least one of the first transfer conduit 32 and the second transfer conduit 36 as shown in FIGS. 1 and 2. The valve unit 40 and at least one of the first transfer conduit 32 and the second transfer conduit 36 are moved by the actuator 28 relative to the other of the first transfer conduit 32 and the second transfer conduit 36 between the opened configuration and the closed configuration. In the illustrative embodiment, the actuator 28 is an electronically controlled device coupled to and controlled by the controller 30 in response to user inputs. In other embodiments, the actuator 28 may be a manually actuated component that a user maneuvers to change the valve unit 40 from the opened configuration to the closed configuration.

The actuator 28 includes a first actuator mount 42 coupled to the first transfer conduit 32, a second actuator mount 44 coupled to the second transfer conduit 36, a motor 46, and a valve mover 48, as shown in FIGS. 2 and 3. The motor 46 is configured to drive the valve mover 48. The valve mover 48 is configured to push and pull at least one of the first transfer conduit 32 and the second transfer conduit 36 relative to one another to open and close the valve unit 40. In the illustrative embodiment, the valve mover 48 is a threaded rod that interacts with the first actuator mount 42 to move the first transfer conduit 32 in response to rotation of the valve mover 48 by the motor 46. In other embodiments, a different type of valve mover may be used, such as a linear actuator, magnet, pneumatic system, etc.

At least a portion of the valve unit 40 is configured to compress and expand in response to movement of the actuator 28 between the closed and opened configurations as suggested in FIGS. 1 and 2. For example, the actuator 28 is configured to move the valve unit 40 between the opened configuration, in which the valve unit 40 has a first axial length and fluid flows through the valve unit 40, and the closed configuration, in which the valve unit 40 has a second axial length less than the first axial length and fluid is blocked from flowing through the valve unit 40.

The valve unit 40 includes a deformable sleeve 50, a valve plunger 52, a plunger guide 54 as shown in FIGS. 2 and 3. The deformable sleeve 50 is coupled to a downstream end of the first transfer conduit 32 and an upstream end of the second transfer conduit 36. The deformable sleeve 50 defines a third interior space 56 between the first and second interior spaces 34, 38. The valve plunger 52 is arranged to lie in at least the third interior space 56 and may extend into the first and second interior spaces 34, 38. The plunger guide is configured to support the valve plunger 52 relative to one of the first transfer conduit 32 and the second transfer conduit 36 and guide the valve plunger 52 for movement relative to the other of the first transfer conduit 32 and the second transfer conduit 36.

The plunger guide 54 includes a plunger retainer 60 coupled to the first transfer conduit 32 and a plunger seat 62 coupled to the second transfer conduit 36 as shown in FIGS. 2 and 3. The plunger retainer 60 extends radially between and interconnects an interior surface of the first transfer conduit 32 and the plunger 52 to fix the plunger relative to the first transfer conduit 32. The plunger seat 62 is coupled to an interior surface of the second transfer conduit 36 and is formed to include a plunger-seat opening 64. The plunger-seat opening 64 is aligned with the valve plunger 52 along an axis 65 that extends through the third interior space 56.

In the opened configuration, the plunger 52 is spaced apart from the plunger-seat opening 64 so that fluid is allowed to pass through the plunger-seat opening 64. In the closed configuration, the plunger 52 engages surfaces of the plunger seat 62 defining the plunger-seat opening 64 so that fluid is blocked from passing through the plunger-seat opening 64.

The deformable sleeve 50 includes a plurality of segments 50A, 50B that extend at angles relative to one another to form a bellows structure between the first and second transfer conduits 32, 36 as shown in FIGS. 1-3. For example, the deformable sleeve 50 includes a first segment 50A that extends radially outwardly away from the first transfer conduit 32 and a second segment 50B coupled to an end of the first segment 50A and spaced apart from the first transfer conduit 32 that extends radially inward toward the axis 65. The first and second segments 50A, 50B form a radially outward peak that allows the deformable sleeve 50 to flex as the first and second transfer conduits 32, 36 move toward and away from one another. The deformable sleeve 50 is shown as including only two sets of segments 50A, 50B, however, in other embodiments, any number of segments 50A, 50B may be used.

As the deformable sleeve 50 flexes, the deformable sleeve 50 increases and decreases in length along axis 65. The deformable sleeve 50 has a first axial length between the first transfer conduit 32 and the second transfer conduit 36 in the opened configuration and a second axial length less than the first axial length between the first transfer conduit 32 and the second transfer conduit 36 in the closed configuration.

The plunger retainer 60 includes a plurality of plunger-retainer arms 66 coupled to the first transfer conduit 32 a plunger support 68 coupled to the plunger-retainer arms 66 as shown in FIGS. 1-3. The plurality of plunger-retainer arms 66 extend radially inward from the interior surfaces of the first transfer conduit 32 toward the axis 65. The plunger support 68 is also coupled to the plunger 52 to support the plunger 52 on the axis 65 and fix the plunger 52 relative to the first transfer conduit 32. In the illustrative embodiment, there are four plunger retainer arms 66, however in other embodiments, one or more plunger retainer arms 66 may be used.

The plunger support 68 is illustratively embodied as an elongated rod that extends along the axis 65 from the first internal space 34 to the second internal space 38 as shown in FIGS. 1-3. The plunger support 68 includes a first end 70 coupled to the plunger-retainer arms 66 and that is arranged to lie upstream of the plunger-seat opening 64 and a second end 72 that is arranged to lie downstream of the plunger-seat opening 64 in both the opened configuration and the closed configuration. The plunger 52 is coupled to the plunger support 68 to lie at least partially between the first end 70 and the plunger-seat opening 64 in both the opened configuration and the closed configuration. Portions of the plunger support 68 may slidingly engage surfaces defining the plunger-seat opening 64 to block movement of the plunger 52 and the plunger support 68 away from the axis 65.

The plunger seat 62 may include a peripheral ring 74 coupled to the second transfer conduit and a plunger receiver 76 coupled to a radially inner end of the peripheral ring 74 as shown in FIGS. 1-3. The peripheral ring 74 and the plunger receiver 76 are formed without any openings except the plunger-seat opening 64 which is formed in a central region of the plunger receiver 76 on axis 65. The plunger receiver 76 has a dome or bowl shape with an upstream-facing surface 77 that is shaped to match an outer contour of the plunger 52.

Figure 6:
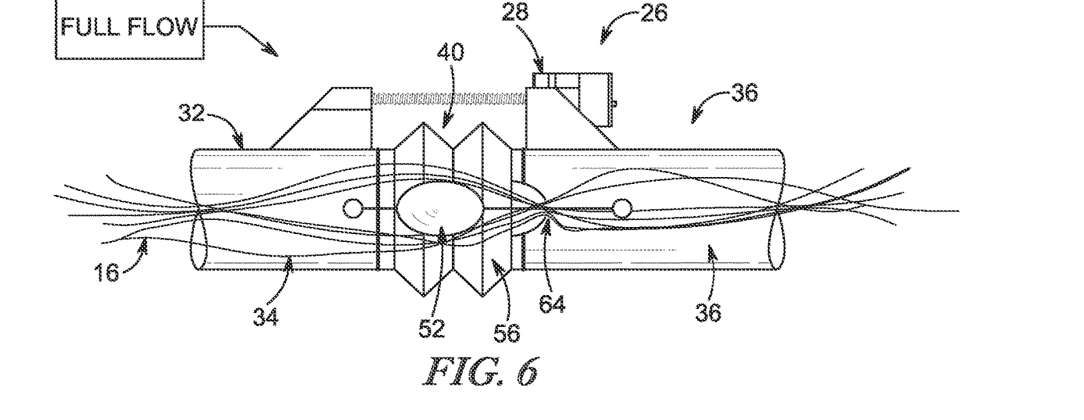
FIG. 6 is a side elevation view of the fluid-distribution system similar to FIG. 1, showing the valve unit in a full-opened configuration allowing a maximum fluid flow rate through the valve unit.
Figure 7:
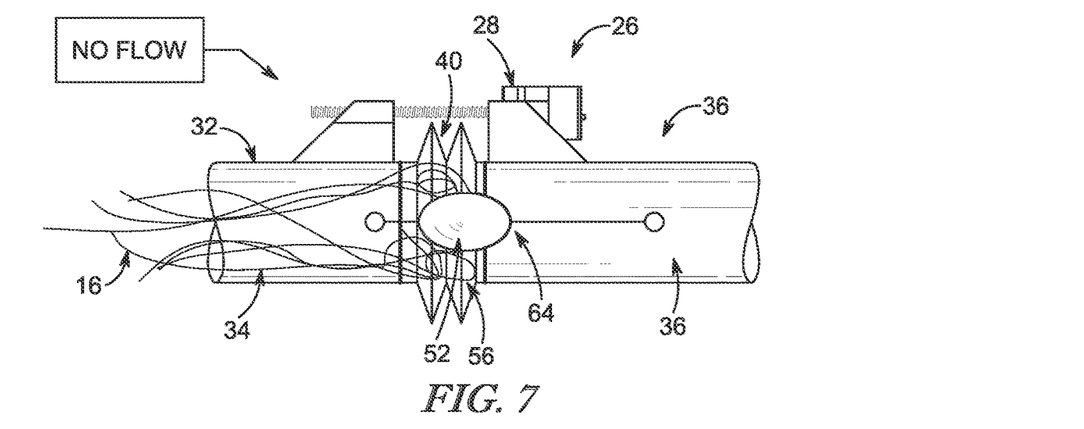
FIG. 7 is a side elevation view of the fluid-distribution system similar to FIG. 2, showing the valve unit in a full-closed configuration blocking substantially all fluid flow through the valve unit.
Figure 8:
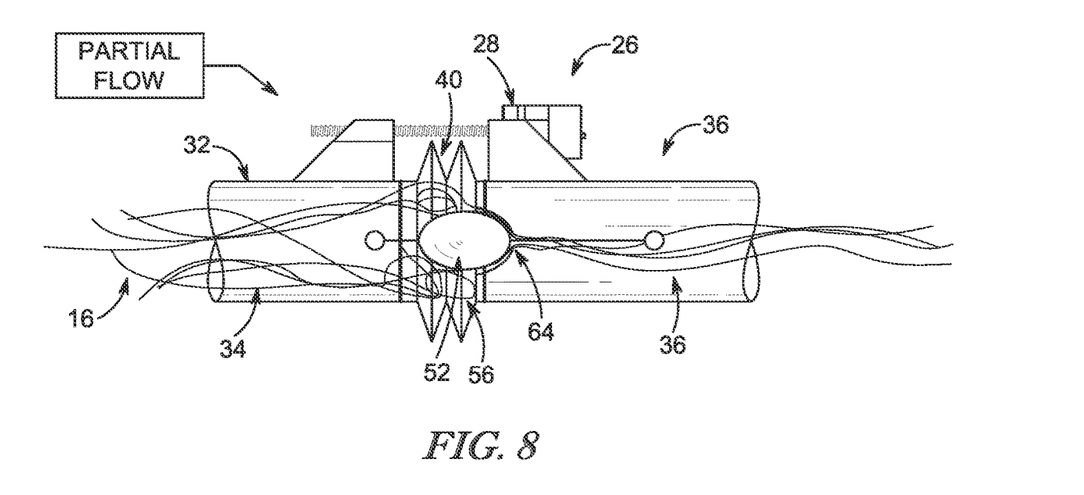
FIG. 8 is a side elevation view of the fluid-distribution system showing the valve unit in an intermediate configuration between the fully-opened configuration and the fully-closed configuration allowing a relatively smaller fluid flow rate through the valve unit.

The controller 30, if included, is configured to activate the actuator 28 to move the first transfer conduit 32 (and the plunger 52) toward and away from the plunger seat 62 to vary the amount of fluid allowed to pass through the plunger seat opening 64 as suggested in FIGS. 6-8. The controller 30 includes a microprocessor 80 and a memory storage device 82. The memory storage device 82 includes instructions stored therein that, when executed by the microprocessor 80, output a command signal to the actuator 28 in response to an input to the fluid-distribution system 26 to cause the actuator 28 to move the valve unit 40 toward or away from the opened configuration, as shown in FIG. 6, or the closed configuration, as shown in FIG. 8. The controller 30 may move the plunger 52 to one or more intermediate positions between opened configuration and the closed configuration to increase or decrease the flow rate of the fluid passing through the plunger-seat opening 64 as shown in FIG. 7.

The following numbered clauses include embodiments that are contemplated and non-limiting:

Clause 1. A fluid-distribution system for a vehicle.

Clause 2. The fluid-distribution system of clause 1, any other suitable clause, and any combination of suitable clauses, the fluid-distribution system comprising a first transfer conduit defining a first interior space, the first transfer conduit coupled to a fluid source and configured to receive and direct a fluid through the first interior space.

Clause 3. The fluid-distribution system of clause 2, any other suitable clause, and any combination of suitable clauses, further comprising a second transfer conduit defining a second interior space, the second transfer conduit spaced apart downstream from the first transfer conduit.

Clause 4. The fluid-distribution system of clause 3, any other suitable clause, and any combination of suitable clauses, further comprising a valve unit extending between and interconnecting the first transfer conduit and the second transfer conduit, the valve unit including a deformable sleeve coupled to a downstream end of the first transfer conduit and an upstream end of the second transfer conduit and defining a third interior space between the first and second interior spaces, a valve plunger arranged to lie in the third interior space, and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends through the third interior space.

Clause 5. The fluid-distribution system of clause 4, any other suitable clause, and any combination of suitable clauses, wherein valve unit is changeable between a first configuration in which the plunger is spaced apart from the plunger-seat opening so that fluid flows through the plunger-seat opening and a second configuration in which the plunger engages surfaces of the plunger seat defining the plunger-seat opening so that fluid is blocked from flowing through the plunger seat opening.

Clause 6. The fluid-distribution system of clause 5, any other suitable clause, and any combination of suitable clauses, wherein the first transfer conduit, the second transfer conduit, and the valve unit are formed as a unitary, one-piece component.

Clause 7. The fluid-distribution system of clause 6, any other suitable clause, and any combination of suitable clauses, wherein the first transfer conduit, the second transfer conduit, and the valve unit are formed by additive manufacturing such that the fluid-distribution system does not include any seals.

Clause 8. The fluid-distribution system of clause 5, any other suitable clause, and any combination of suitable clauses, wherein the deformable sleeve has a first axial length between the first transfer conduit and the second transfer conduit in the first configuration and a second axial length between the first transfer conduit and the second transfer conduit in the second configuration.

Clause 9. The fluid-distribution system of clause 8, any other suitable clause, and any combination of suitable clauses, wherein the deformable sleeve includes a first segment that extends radially outwardly away from first transfer conduit and a second segment coupled to an end of the first segment spaced apart from the first transfer conduit that extends radially inward toward the axis.

Clause 10. The fluid-distribution system of clause 5, any other suitable clause, and any combination of suitable clauses, wherein the plunger retainer includes a plunger-retainer arm coupled to the first transfer conduit and that extends radially inward toward the axis and a plunger support coupled to the plunger-retainer arm and the plunger to support the plunger on the axis.

Clause 11. The fluid-distribution system of clause 10, any other suitable clause, and any combination of suitable clauses, wherein the plunger support includes a first end coupled to the plunger-retainer arm and arranged to lie upstream of the plunger-seat opening and a second end that is arranged to lie downstream of the plunger-seat opening in both the first configuration and the second configuration.

Clause 12. The fluid-distribution system of clause 11, any other suitable clause, and any combination of suitable clauses, wherein the plunger is coupled to the plunger support to lie between the first end and the plunger-seat opening in both the first configuration and the second configuration.

Clause 13. The fluid-distribution system of clause 5, any other suitable clause, and any combination of suitable clauses, wherein the plunger seat includes a peripheral ring coupled to the second transfer conduit and a plunger receiver coupled to a radially inner end of the peripheral ring.

Clause 14. The fluid-distribution system of clause 13, any other suitable clause, and any combination of suitable clauses, wherein the plunger receiver has an upstream-facing surface that is shaped to match an outer contour of the plunger.

Clause 15. A fluid-control system configured to direct a fluid from a fluid source and control discharge of the fluid for use with a vehicle sub-system, the fluid-control system comprising.

Clause 16. The fluid control system of clause 15, any other suitable clause, and any combination of suitable clauses, further comprising a fluid-distribution system coupled to the fluid source, the fluid-distribution system including a first transfer conduit defining a first interior space, the first transfer conduit coupled to a fluid source and configured to receive and direct a fluid through the first interior space, a second transfer conduit defining a second interior space, the second transfer conduit spaced apart downstream from the first transfer conduit, and a deformable valve unit extending between and interconnecting the first transfer conduit and the second transfer conduit.

Clause 17. The fluid control system of clause 16, any other suitable clause, and any combination of suitable clauses, further comprising an actuator coupled to the first transfer conduit and the second transfer conduit and configured to move the valve unit between a first configuration in which the valve unit has a first axial length and fluid flows through the valve unit and a second configuration in which the valve unit has a second axial length less than the first axial length and fluid is blocked from flowing through the valve unit.

Clause 18. The fluid-control system of clause 17, any other suitable clause, and any combination of suitable clauses, further comprising a controller including a microprocessor and a memory storage device, the memory storage device including instructions stored therein that, when executed by the microprocessor, output a command signal to the actuator in response to an input to cause the actuator to move the valve unit to the first configuration or the second configuration.

Clause 19. The fluid-control system of clause 17, any other suitable clause, and any combination of suitable clauses, wherein the first transfer conduit, the second transfer conduit, and the valve unit are formed as a unitary, one-piece component by additive manufacturing such that the fluid-distribution system does not include any seals.

Clause 20. The fluid-control system of clause 17, any other suitable clause, and any combination of suitable clauses, wherein the valve unit includes a sleeve coupled to a downstream end of the first transfer conduit and an upstream end of the second transfer conduit and defining a third interior space between the first and second interior spaces, a valve plunger arranged to lie in the third interior space, and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends through the third interior space, and wherein valve unit is changeable between a first configuration in which the plunger is spaced apart from the plunger-seat opening so that fluid flows through the plunger-seat opening and a second configuration in which the plunger engages surfaces of the plunger seat defining the plunger-seat opening so that fluid is blocked from flowing through the plunger seat opening.

Clause 21. The fluid-control system of clause 20, any other suitable clause, and any combination of suitable clauses, wherein the plunger retainer includes a plunger-retainer arm coupled to the first transfer conduit and that extends radially inward toward the axis and a plunger support coupled to the plunger-retainer arm and the plunger to support the plunger on the axis, wherein the plunger support includes a first end coupled to the plunger-retainer arm and arranged to lie upstream of the plunger-seat opening and a second end that is arranged to lie downstream of the plunger-seat opening in both the first configuration and the second configuration, and wherein the plunger is coupled to the plunger support to lie between the first end and the plunger-seat opening in both the first configuration and the second configuration.

Clause 22. The fluid-control system of clause 21, any other suitable clause, and any combination of suitable clauses, wherein the plunger seat includes a peripheral ring coupled to the second transfer conduit and a plunger receiver coupled to a radially inner end of the peripheral ring and defining the plunger-seat opening, and wherein the plunger receiver has an upstream-facing surface that is shaped to match an outer contour of the plunger.

Clause 23. A vehicle comprising a vehicle sub-system.

Clause 24. The vehicle of clause 23, any other suitable clause, and any combination of suitable clauses, further comprising a fluid source configured to supply a fluid for use by the vehicle sub-system.

Clause 25. The vehicle of clause 24, any other suitable clause, and any combination of suitable clauses, a fluid-control system coupled between the vehicle sub-system and the fluid source and configured to direct the fluid from the fluid source and control discharge of the fluid for use with the vehicle sub-system, the fluid-control system including.

Clause 26. The vehicle of clause 25, any other suitable clause, and any combination of suitable clauses, further comprising a fluid-distribution system coupled to the fluid source, the fluid-distribution system including a first transfer conduit defining a first interior space, the first transfer conduit coupled to a fluid source and configured to receive and direct a fluid through the first interior space, a second transfer conduit defining a second interior space, the second transfer conduit spaced apart downstream from the first transfer conduit, and a deformable valve unit extending between and interconnecting the first transfer conduit and the second transfer conduit.

Clause 27. The vehicle of clause 26, any other suitable clause, and any combination of suitable clauses, further comprising an actuator coupled to the first transfer conduit and the second transfer conduit and configured to move the valve unit between a first configuration in which the valve unit has a first axial length and fluid flows through the valve unit and a second configuration in which the valve unit has a second axial length less than the first axial length and fluid is blocked from flowing through the valve unit.

Clause 28. The vehicle of clause 27, any other suitable clause, and any combination of suitable clauses, further comprising a controller including a microprocessor and a memory storage device, the memory storage device including instructions stored therein that, when executed by the microprocessor, output a command signal to the actuator in response to an input to cause the actuator to move the valve unit to the first configuration or the second configuration.

Clause 29. The vehicle of clause 28, wherein the first transfer conduit, the second transfer conduit, and the valve unit are formed as a unitary, one-piece component by additive manufacturing such that the fluid-distribution system does not include any seals.

Clause 30. The vehicle of clause 29, wherein the valve unit includes a sleeve coupled to a downstream end of the first transfer conduit and an upstream end of the second transfer conduit and defining a third interior space between the first and second interior spaces, a valve plunger arranged to lie in the third interior space, and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends through the third interior space.

Clause 31. The vehicle of clause 30, any other suitable clause, and any combination of suitable clauses, wherein valve unit is changeable between a first configuration in which the plunger is spaced apart from the plunger-seat opening so that fluid flows through the plunger-seat opening and a second configuration in which the plunger engages surfaces of the plunger seat defining the plunger-seat opening so that fluid is blocked from flowing through the plunger seat opening.

Clause 32. The vehicle of clause 31, any other suitable clause, and any combination of suitable clauses, wherein the deformable sleeve includes a first segment that extends radially outwardly away from first transfer conduit and a second segment coupled to an end of the first segment spaced apart from the first transfer conduit that extends radially inward toward the axis, and wherein the deformable sleeve has a first axial length between the first transfer conduit and the second transfer conduit in the first configuration and a second axial length between the first transfer conduit and the second transfer conduit in the second configuration.

Clause 33. The vehicle of clause 32, any other suitable clause, and any combination of suitable clauses, wherein the plunger retainer includes a plunger-retainer arm coupled to the first transfer conduit and that extends radially inward toward the axis and a plunger support coupled to the plunger-retainer arm and the plunger to support the plunger on the axis, wherein the plunger support includes a first end coupled to the plunger-retainer arm and arranged to lie upstream of the plunger-seat opening and a second end that is arranged to lie downstream of the plunger-seat opening in both the first configuration and the second configuration, and wherein the plunger is coupled to the plunger support to lie between the first end and the plunger-seat opening in both the first configuration and the second configuration.

The invention claimed is:

1. A fluid-distribution system for a vehicle, the fluid-distribution system comprising
    a first transfer conduit defining a first interior space, the first transfer conduit coupled to a fluid source and configured to receive and direct a fluid through the first interior space,
    a second transfer conduit defining a second interior space, the second transfer conduit spaced apart downstream from the first transfer conduit, and
    a valve unit extending between and interconnecting the first transfer conduit and the second transfer conduit, the valve unit including a deformable sleeve coupled to a downstream end of the first transfer conduit and an upstream end of the second transfer conduit and defining a third interior space between the first and second interior spaces, a valve plunger arranged to lie in the third interior space, and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends through the third interior space,
    wherein valve unit is changeable between a first configuration in which the plunger is spaced apart from the plunger-seat opening so that fluid flows through the plunger-seat opening and a second configuration in which the plunger engages surfaces of the plunger seat defining the plunger-seat opening so that fluid is blocked from flowing through the plunger seat opening, and
    wherein the plunger retainer includes a plunger support coupled to the plunger to support the plunger on the axis, the plunger support having a first end arranged to lie upstream of the plunger-seat opening and a second end arranged to lie downstream of the plunger-seat opening in both the first configuration and the second configuration.

2. The fluid-distribution system of claim 1, wherein the first transfer conduit, the second transfer conduit, and the valve unit are formed as a unitary, one-piece component.

3. The fluid-distribution system of claim 2, wherein the first transfer conduit, the second transfer conduit, and the valve unit are formed by additive manufacturing such that the fluid-distribution system does not include any seals.

4. The fluid-distribution system of claim 1, wherein the deformable sleeve has a first axial length between the first transfer conduit and the second transfer conduit in the first configuration and a second axial length between the first transfer conduit and the second transfer conduit in the second configuration.

5. The fluid-distribution system of claim 4, wherein the deformable sleeve includes a first segment that extends radially outwardly away from first transfer conduit and a second segment coupled to an end of the first segment spaced apart from the first transfer conduit that extends radially inward toward the axis.

6. The fluid-distribution system of claim 1, wherein the plunger retainer further includes a plunger-retainer arm coupled to the first transfer conduit and that extends radially inward toward the axis and the plunger support is further coupled to the plunger-retainer arm.

7. The fluid-distribution system of claim 6, wherein the first end of the plunger support is coupled to the plunger-retainer arm.

8. The fluid-distribution system of claim 7, wherein the plunger is coupled to the plunger support to lie between the first end and the plunger-seat opening in both the first configuration and the second configuration.

9. The fluid-distribution system of claim 1, wherein the plunger seat includes a peripheral ring coupled to the second transfer conduit and a plunger receiver coupled to a radially inner end of the peripheral ring.

10. The fluid-distribution system of claim 9, wherein the plunger receiver has an upstream-facing surface that is shaped to match an outer contour of the plunger.

11. A fluid-control system configured to direct a fluid from a fluid source and control discharge of the fluid for use with a vehicle sub-system, the fluid-control system comprising:
a fluid-distribution system coupled to the fluid source, the fluid-distribution system including a first transfer conduit defining a first interior space, the first transfer conduit coupled to the fluid source and configured to receive and direct a fluid through the first interior space, a second transfer conduit defining a second interior space, the second transfer conduit spaced apart downstream from the first transfer conduit, and a deformable valve unit extending between and interconnecting the first transfer conduit and the second transfer conduit, and
an actuator coupled to the first transfer conduit and the second transfer conduit and configured to move the valve unit between a first configuration in which the valve unit has a first axial length and fluid flows through the valve unit and a second configuration in which the valve unit has a second axial length less than the first axial length and fluid is blocked from flowing through the valve unit,
wherein the deformable valve unit includes a valve plunger arranged to lie between the first transfer conduit and the second transfer conduit and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends between the first interior space and the second interior space, and
wherein the plunger retainer includes a plunger support coupled to the plunger to support the plunger on the axis, the plunger support having a first end arranged to lie upstream of the plunger-seat opening and a second end arranged to lie downstream of the plunger-seat opening in both the first configuration and the second configuration.

12. The fluid-control system of claim 11, further comprising a controller including a microprocessor and a memory storage device, the memory storage device including instructions stored therein that, when executed by the microprocessor, output a command signal to the actuator in response to an input to cause the actuator to move the valve unit to the first configuration or the second configuration.

13. The fluid control system of claim 11, wherein the first transfer conduit, the second transfer conduit, and the valve unit are formed as a unitary, one-piece component by additive manufacturing such that the fluid-distribution system does not include any seals.

14. The fluid-control system of claim 11, wherein the valve unit further includes a sleeve coupled to a downstream end of the first transfer conduit and an upstream end of the second transfer conduit and defining a third interior space between the first and second interior spaces, and wherein when the valve unit is in the first configuration the plunger is spaced apart from the plunger-seat opening so that fluid flows through the plunger-seat opening and when the valve unit is in the second configuration the plunger engages surfaces of the plunger seat defining the plunger-seat opening so that fluid is blocked from flowing through the plunger seat opening.

15. The fluid-control system of claim 14, wherein the plunger retainer further includes a plunger-retainer arm coupled to the first transfer conduit and that extends radially inward toward the axis and the first end of the plunger support is coupled to the plunger-retainer arm, and wherein the plunger is coupled to the plunger support to lie between the first end and the plunger-seat opening in both the first configuration and the second configuration.

16. The fluid-control system of claim 15, wherein the plunger seat includes a peripheral ring coupled to the second transfer conduit and a plunger receiver coupled to a radially inner end of the peripheral ring and defining the plunger-seat opening, and wherein the plunger receiver has an upstream-facing surface that is shaped to match an outer contour of the plunger.

17. A vehicle comprising
a vehicle sub-system,
a fluid source configured to supply a fluid for use by the vehicle sub-system, and
a fluid-control system coupled between the vehicle sub-system and the fluid source and configured to direct the fluid from the fluid source and control discharge of the fluid for use with the vehicle sub-system, the fluid-control system including:
a fluid-distribution system coupled to the fluid source, the fluid-distribution system including a first transfer conduit defining a first interior space, the first transfer conduit coupled to the fluid source and configured to receive and direct a fluid through the first interior space, a second transfer conduit defining a second interior space, the second transfer conduit spaced apart downstream from the first transfer conduit, and a deformable valve unit extending between and interconnecting the first transfer conduit and the second transfer conduit,
an actuator coupled to the first transfer conduit and the second transfer conduit and configured to move the valve unit between a first configuration in which the valve unit has a first axial length and fluid flows through the valve unit and a second configuration in which the valve unit has a second axial length less than the first axial length and fluid is blocked from flowing through the valve unit, and a controller including a microprocessor and a memory storage device, the memory storage device including instructions stored therein that, when executed by the microprocessor, output a command signal to the actuator in response to an input to cause the actuator to move the valve unit to the first configuration or the second configuration, wherein the deformable valve unit includes a valve plunger arranged to lie between the first transfer conduit and the second transfer conduit and a plunger guide including a plunger retainer extending between and interconnecting an interior surface of the first transfer conduit and the plunger to fix the plunger relative to the first transfer conduit and a plunger seat coupled to an interior surface of the second transfer conduit and formed to include a plunger-seat opening aligned with the valve plunger along an axis that extends between the first interior space and the second interior space, and wherein the plunger retainer includes a plunger support coupled to the plunger to support the plunger on the axis, the plunger support having a first end arranged to lie upstream of the plunger-seat opening and a second end arranged to lie downstream of the plunger-seat opening in both the first configuration and the second configuration.

18. The vehicle of claim 17, wherein the first transfer conduit, the second transfer conduit, and the valve unit are formed as a unitary, one-piece component by additive manufacturing such that the fluid-distribution system does not include any seals.

19. The vehicle of claim 18, wherein the valve unit further includes a sleeve coupled to a downstream end of the first transfer conduit and an upstream end of the second transfer conduit and defining a third interior space between the first and second interior spaces wherein when the valve unit is in the first configuration the plunger is spaced apart from the plunger-seat opening so that fluid flows through the plunger-seat opening and when the valve unit is in the second configuration the plunger engages surfaces of the plunger seat defining the plunger-seat opening so that fluid is blocked from flowing through the plunger seat opening, and wherein the sleeve includes a first segment that extends radially outwardly away from first transfer conduit and a second segment coupled to an end of the first segment spaced apart from the first transfer conduit that extends radially inward toward the axis, and wherein the deformable sleeve has a first axial length between the first transfer conduit and the second transfer conduit in the first configuration and a second axial length between the first transfer conduit and the second transfer conduit in the second configuration.

20. The vehicle of claim 19, wherein the plunger retainer further includes a plunger-retainer arm coupled to the first transfer conduit and that extends radially inward toward the axis the first end of the plunger support is coupled to the plunger-retainer, and wherein the plunger is coupled to the plunger support to lie between the first end and the plunger-seat opening in both the first configuration and the second configuration.

* * * * *